(12) United States Patent
Lambert (10) Patent No.: US 7,216,337 B2
(45) Date of Patent: May 8, 2007

(54) AUTOMATIC DETERMINATION OF INVALID CALL SEQUENCES IN SOFTWARE COMPONENTS

(75) Inventor: John Robert Lambert, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 10/413,276

(22) Filed: Apr. 14, 2003

(65) Prior Publication Data

US 2004/0205725 A1 Oct. 14, 2004

(51) Int. Cl.
*G06F 9/45* (2006.01)

(52) U.S. Cl. ..................................................... 717/124
(58) Field of Classification Search ................. 717/124
See application file for complete search history.

(56) References Cited

U.S. PATENT DOCUMENTS

| | | | | |
|---|---|---|---|---|
| 5,371,883 A | * | 12/1994 | Gross et al. ................... | 714/38 |
| 5,490,249 A | * | 2/1996 | Miller ........................... | 714/38 |
| 5,565,316 A | * | 10/1996 | Kershaw et al. ............. | 434/322 |
| 5,652,835 A | * | 7/1997 | Miller ........................... | 714/38 |
| 6,085,029 A | * | 7/2000 | Kolawa et al. ................ | 714/38 |
| 6,301,701 B1 | * | 10/2001 | Walker et al. ............... | 717/125 |
| 6,425,118 B1 | * | 7/2002 | Molloy et al. ............... | 717/136 |
| 6,601,018 B1 | * | 7/2003 | Logan .......................... | 702/186 |
| 6,983,380 B2 | * | 1/2006 | Ko ................................. | 726/1 |
| 7,150,008 B2 | * | 12/2006 | Cwalina et al. ............. | 717/126 |
| 2004/0015866 A1 | * | 1/2004 | Estep et al. .................. | 717/124 |

OTHER PUBLICATIONS

Ezust et al., An Automatic Trace Analysis Tool Generator, 1995, ACM, 9. 175-184.*

* cited by examiner

*Primary Examiner*—John Chavis
(74) *Attorney, Agent, or Firm*—Workman Nydegger (57) ABSTRACT

Computerized testing of an object to identify one or more call sequences that give rise to exceptions. A set of potential operations (consisting of methods and associated parameter values) is automatically generated. A parameter generator may supply interesting parameter values that may more likely result in a thrown exception. A number of call sequences is automatically constructed using the operations in the set of operations as steps in the sequence. Each call sequence is then executed using a new instance of the object. If an exception is thrown, a report may be issued containing information helpful in evaluating whether the exception is appropriate. This information might include the exception type as well as the invalid call sequence that gave rise to the thrown exception. The invalid call sequence may also be minimized to assist the tester in evaluating the root cause and appropriateness of the exception.

27 Claims, 3 Drawing Sheets

AUTOMATIC DETERMINATION OF INVALID CALL SEQUENCES IN SOFTWARE COMPONENTS

BACKGROUND OF THE INVENTION

1. The Field of the Invention

The present invention relates to software development technology. More specifically, the present invention relates to mechanisms for testing an object to identify call sequences that result in thrown exceptions.

2. Background and Related Art

Computers have revolutionized the way we work and play. There are an enormous variety of functions and applications that may be implemented by a general purpose computing system in response to the execution of a software application. The utility and functionality of the computing system does, however, rely on the proper coding of the source code that was compiled or interpreted into the binary instructions that are actually executed by the processor. If there is a coding error, this will often result in a deviation from expected functionality.

Extraordinary efforts are currently in place to reduce the number of unexpected functionality deviations in many software programs before and after the software application is shipped to market. However, the creativity of software programmers and designers has led to increasingly complex and powerful software applications. As the complexity of the software application increases, so often does the number of lines of source code needed to generate the software application.

One way of drafting source code in a more organized manner is to use object-oriented programming to cause run-time objects to be generated in memory. These objects have methods associated with them. For example, an object of a particular class called "File" may have a number of methods associated therewith that allow operation on a file. For example, appropriate operations for an object of class "File" may be to open, read, write, close, or check status of the file. Each of these methods may have zero or more permitted parameters associated therewith. For example, the "read" method may include parameters to express how many bytes of the file to read, and/or where to start reading from, and the like. The method with specific parameters is often termed as an "operation". Similarly, a method having zero parameters is also often termed an "operation" even without parameters. Objects also often have associated data. In the file object example introduced above, the file itself (plus potentially some related data often termed "metadata") may be the object data.

Although object-oriented programming has provided significant organization to the programming task, inevitable human errors will be introduced into at least early versions of the source code. In order to reduce performance deviations of the software application, it is common to test the software application to identify any performance deviations. In particular with object-oriented programming, one may also test the proper operation of an individual object.

Even during normal and proper operation of an object, the object may encounter a situation that it cannot address. A particular sequence of operations (also called a "call sequence") may result in such a situation. For example, suppose that after a file object is constructed, one calls the following call sequence in this order as expressed in pseudocode: open(filename), close(filename), write(filename) . . . . The file object will not be able to implement the write operation since the file needs to be open in order to write to it, and since the file was just closed in the previous operation. Call sequences that lead to the object being unable to implement an operation of the call sequence are referred to herein as "invalid call sequences".

When such errors occur due to an invalid call sequence, the object "throws an exception." This means that the object notifies the runtime environment that an error has occurred and the exception is displayed and/or noted for future reference. There are typically different exceptions for different detected errors. A particular exception type may correspond to a particular one or more methods of the object.

For example, the open method of the file object may have a "file not found" exception to describe that the file cannot be opened because it was not found. The read (or write) method of the file object may have a "file read" (or "file write") error to indicate that although the file is open, something about the read (or write) operation has failed. The read (or write) method of the file object may also have a "file closed already" error to indicate that the file is closed and thus cannot be read (or written to). The close method of the file object may have a "file closed already" error to indicate that the file is already closed, and thus cannot be closed again. The check status method of the file object may have a "file not open" exception to indicate that the status of the file cannot be accessed since the file is not open.

The throwing of the proper exception allows the programmer to determine why proper operation was not obtained. If an exception is not thrown at the appropriate time, the object may continue operation for one or more further operations before throwing an unexpected exception that is less representative of the original problem. Accordingly, it is important that the object throws the proper exception in response to a corresponding detected error. One aspect of testing software applications is to make sure that the object throws the right exception in response to an invalid call sequence.

One conventional method of doing this is to have a human tester manually generate an invalid call sequence, execute the call sequence again the object, verify that the correct exception was thrown, and then repeat the process for other invalid call sequences. This can be quite time consuming since it relies on the imagination and effort of the tester to come up with potential invalid call sequences. In addition, the set of invalid call sequences that the tester comes up with can be incomplete despite valiant efforts of the tester. Accordingly, what would be advantageous are mechanisms for testing of an object to detect invalid call sequences in a more automated manner.

BRIEF SUMMARY OF THE INVENTION

The foregoing problems with the prior state of the art are overcome by the principles of the present invention which are directed towards mechanisms for automatically testing an object to identify one or more call sequences that give rise to exceptions. A set of possible operations that may be performed by the object are generated. Each object includes one or more methods. Each method includes zero or more parameter types associated therewith. If a method includes zero parameters, that method may be included directly in the set of operations that may be performed by the object. If the method includes one or more parameter types, then a set of interesting parameters is generated that correspond to each parameter type. The generated parameters are used to fill in the appropriate parameter types in the methods to thereby generate more operations that may be performed by the object.

The generated parameters for a given parameter type are designed to encourage an exception to be thrown. For example, if the method was to "read" with the associated parameter type being an integer that represents the number of bytes to read. The integer minus one (i.e., "−1") may be used as an interesting parameter since that should cause an exception to be thrown since reading a negative amount of information does not make logical sense.

Using this pool of possible operations, a call sequence is automatically constructed. The call sequence is then executed using the object. If an exception is thrown, a report may be issued that specifies information helpful in evaluating whether the exception is proper or not. This information might include the exception type as well as the call sequence that gave rise to the thrown exception.

Optionally, the call sequence may be minimized by removing one or more operations from the call sequence and then determining whether or not the same exception is thrown. In that case, the minimized call sequence may also be reported. By minimizing the call sequence that results in the exception being thrown, the tester may more intuitively evaluate the root cause of the thrown exception.

This process occurs automatically with the tester perhaps only seeing the final reports. Accordingly, since the method does not rely on the substantial time and effort required of human beings to generate invalid call sequences, the tester's time may be more suitably focused on evaluating the appropriateness of the thrown exceptions, rather than generating and executing the invalid call sequences.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program product for testing of an object to identify one or more call sequences that give rise to exceptions. A set of operations that may be performed by the object are generated using the methods and associated parameters types of the methods. A parameter generator may supply interesting parameter values for a particular parameter type that may more likely result in a thrown exception. A number of call sequences is automatically constructed using the operations in the set of operations as steps in the sequence. Each call sequence is then executed using a new instance of the object. If an exception is thrown, a report may be issued containing information helpful in evaluating whether the exception is appropriate. This information might include the exception type as well as the call sequence that gave rise to the thrown exception.

The embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

Although not required, the invention will be described in the general context of computer-executable instructions, such as program modules, being executed by computers in network environments. Generally, program modules include routines, programs, objects, components, data structures, etc. that perform particular tasks or implement particular abstract data types.

Figure 1:
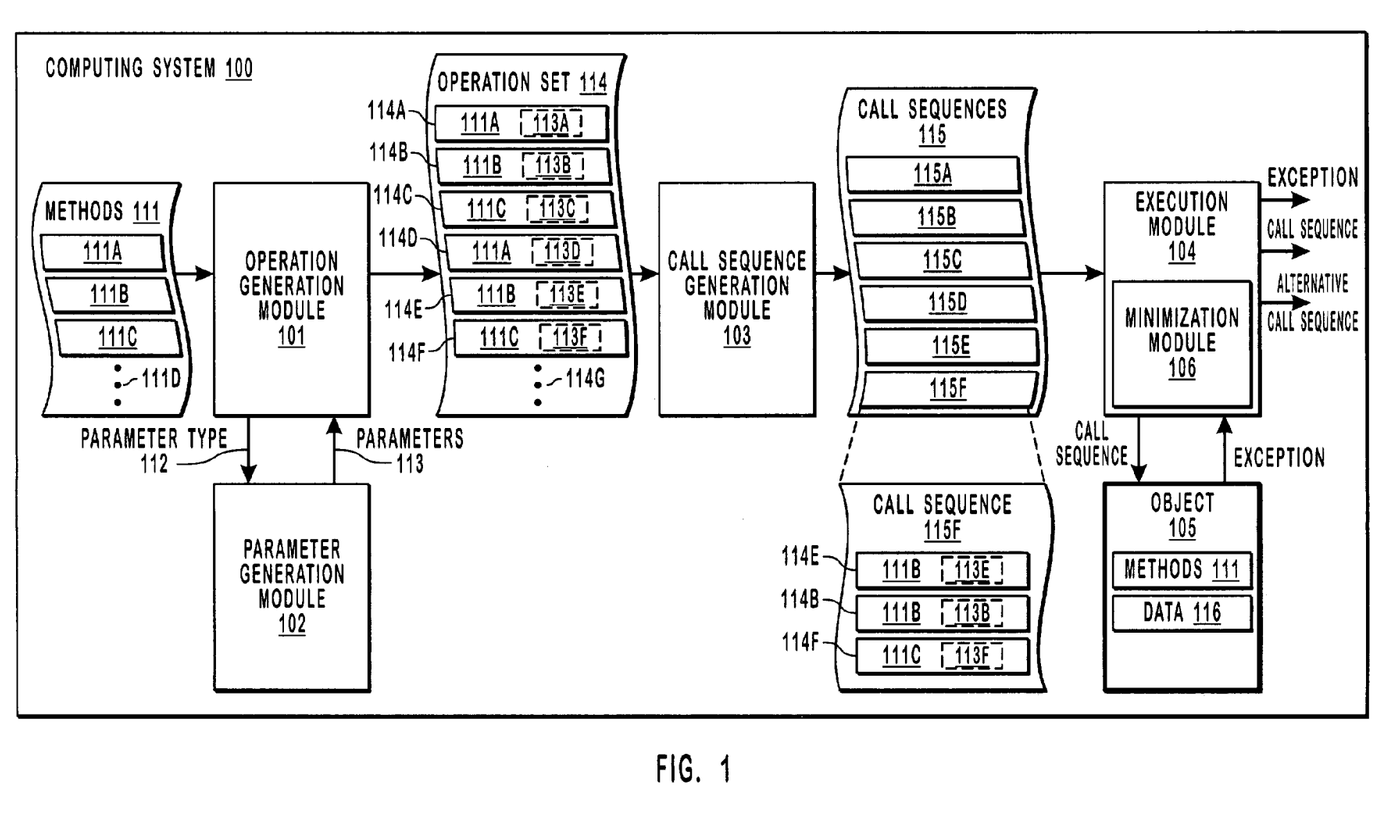
FIG. 1 schematically illustrates a computing system and associated modules and data structures performing testing of an object in accordance with the principles of the present invention.

FIG. 1 schematically illustrates a computing system 100 and associated modules and data structures that cooperatively interact to perform automated testing of an object in accordance with the principles of the present invention. The computing system may be any computing system that is capable of executing operations against software objects. One example of such a computing system is illustrated and described below with respect to FIG. 4. However, those skilled in the art will recognize after having reviewed this description, that any computing system may implement the features of the present invention with suitable software and/or hardware.

The computing system 100 is testing an object 105 to automatically identify invalid call sequences. As previously mentioned, invalid call sequences executed on an object cause the object to throw exceptions. The tester then may focus his or her attention on whether or not the proper exception has been thrown, rather than having to worry about generating invalid call sequences, and executing those invalid call sequences on the object.

The object 105 has a more bolded outline to represent that this object is the item being tested. The other rectangular elements (e.g., operation generation module 101, parameter generation module 102, call sequence generation module 103, execution module 104 and minimization module 106) within the computing system 100 represent executable modules that facilitate testing of the object 105. The scrolled elements (e.g., methods 111, operation set 114, and call sequences 115 represent data that facilitate testing of the object 105. As is conventionally known in the art of object-oriented programming, an object 105 includes one or more methods and optionally data as well. For example, object 105 includes methods 111 and data 116.

The cooperative interaction of these various components will be described with further reference to FIG. 2, which illustrates a flowchart of a method 200 for testing the object to identify invalid call sequences in accordance with the principles of the present invention. Accordingly, FIG. 1 will be described with frequent reference to FIG. 2.

The method 200 includes an optional act of identifying a set of one or more expected exceptions for the object (act 201). The act 201 is illustrated using a dashed box to emphasize the optional nature of the act. For example, for the above example in which the object 105 is a file, the expected exceptions would include a "file not found", "file read", "file write", "file closed already", and "file not open" exceptions. These exceptions may be identified by simply believing a source about the exceptions associated with the object. For example, a manual, white paper, or other document may identify the exceptions. The exceptions may also be manually identified by examining source code for the object under test. The exceptions for the object may also be automatically identified using software that examines either the source code, intermediate format code, and binary instructions for the object. Methods for examining the structure of the binary instructions to identify exceptions is described in commonly-owned co-pending U.S. patent application Ser. No. 10/413,254, filed on the same day as the present patent application, and entitled "Non-Invasive Rule-Based Binary Analysis of Software Assemblies", which patent application is incorporated herein by reference in its entirety.

The method 200 also includes a functional, result-oriented step for automatically identifying an invalid call sequence that gives rise to an exception (step 202). This step may include any corresponding acts for accomplishing this result. However, in the illustrated embodiment of FIG. 2, the step includes corresponding acts 203, 204, 205 and 206.

Specifically, a set or pool of possible operations that may be performed by the object is generated (act 203). Referring to FIG. 1, this may be accomplished by operation generation module 101. The operations that are generated by the operation generation module 101 are highly dependent on the methods offered by the object under test. Accordingly, the operation generation module 101 receives the methods 111 of the object 105 as input. There may be one or more methods offered by the object. However, in the particular example illustrated in FIG. 1, the methods 111 include method 111A, 111B, 111C, among potentially others as represented by the vertical ellipses 111D.

For any method that does not require any parameters, the method may be included directly in the set of possible operations 114. However, most methods require one or more parameters, each parameter having a particular parameter type. For example, parameter types may include integers, floating point numbers, arrays, strings, Boolean values, and the like as will be well-familiar to those or ordinary skill in the art of programming and testing. For any given parameter type, a parameter generation module generates a parameter of interest that is more likely than a randomly selected parameter of that type to cause an exception to occur.

For example, for an integer parameter type, values of −1, +1, 0, and +20,000,000,000 might be more likely to cause an exception to occur. For example, the read method of the file object may have an integer parameter type to express the number of bytes to read. A "−1" integer value should cause an exception since reading negative one bytes of information does not make logical sense. A "0" integer value would most probably cause an exception since reading zero bytes of information would be a useless act. A "+20,000,000,000" should cause an exception assuming that this value is larger than the file size. A "+1" integer value (or any other positive integer value for that matter) may cause an exception to occur if the file is closed at the time of the read operation.

Figure 3:
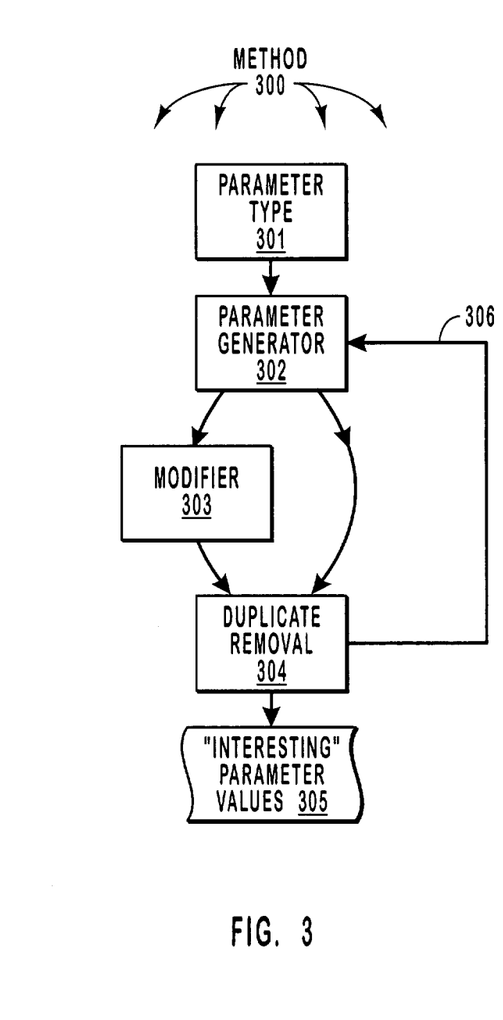
FIG. 3 illustrates a method for automatically generating parameters.

FIG. 3 illustrates a method 300 for generating parameter values. The parameter type is provided as input to the method 300 (act 301). Then, an initial interesting parameter is generated. For example, for integer parameter types, "−1", "+1", "0", and "+20,000,000,000" are interesting integer value types. The initially generated values may then be provided to a modifier (act 303), which may modify the parameters with an operation to result in a list of parameters having the same parameter type. For example, the operations suitable for an integer parameter type may include addition "+", subtraction "−", division "/", and multiplication. For example, the addition operation may result in values of −2 (from −1 +−1), 0 (from −1 ++1),−1(from −1 +0), 19,999, 999,999 (from−1 +20,000,000,000), +2 (from+1 ++1), +1 (from+1 +0), 20,000,000,001 (from 1 +20,000,000,000), 0 (from 0 +0), +20,000,000,000 (from 0 +20,000,000,000), and 40,000,000,000 (from 20,000,000,000 + 20,000,000, 000). Duplicates are then removed (act 304). The acts 302, 303 and 304 may be performed just once, or repeated as represented by arrow 306 to form the "interesting" parameter values (act 305).

The act of initially generating parameter values 302 and the act of modifying the parameter values 303 are highly dependent on what the parameter types are. Interesting parameter values may be determined by one having experience on what might generate an exception. For example, for string types, an arbitrary string (e.g., "foo") might be one parameter, an overlengthy string may be another string, a control character may be another, and so forth. For array types having specific dimensions, an array smaller than the designated dimensions may be recursively generated, an array the same size as the specific dimensions may be generated, and an array larger than the designated dimensions may be generated. Boolean values are a more straightforward case, in which the interesting Boolean values may be simply "True" or "False". For floating point values, 1E1000 should generate an arithmetic (or overflow/underflow) exception when object operations are performed against it. 1E-1000 should do the same. 1E-1000 may do the same if that floating point were to be treated as a denominator in the object.

Values may be modified by performing operations that result in a value of the same parameter type. For example, for strings, an operation may be to make all capitalized letters, lower-case, and another operation to do the reverse. Also, strings may have a "get all subsequences" operations in which the operation receiving a string "abc" would provide strings "a", "ab", and "abc". For arrays, addition, subtraction, cross-product, dot-product may be operations, for floating point values, addition, subtraction, division, and multiplication may be operations.

The process of generating parameters that are more likely to generate an exception is highly subjective. Any method for generating such parameters falls within the scope of the principles of the present invention, even brute force random generation will suffice. However, selecting parameters that would more likely result in the throwing of an exception increase efficiency by increasing the percentage of invalid call sequences generated.

Referring back to FIG. 1, the parameter generation is represented by operation generation module 101 supplying parameter types 112 to the parameter generation module 102, and by the parameter generation module 102 returning specific interesting parameters 113 corresponding to the parameter types 112 back to the operation generation module 101. The operation generation module 101 then places specific values of a particular parameter type in where the particular parameter type belongs in the method. This is done for each parameter in the method to generate an operation. That operation is then included in the pool of possible operations 114 that may be performed by the object 105.

Referring to FIG. 1, the operation set 114 includes, as an example, operation 114A which includes parameters 113A populating the method 111A, operation 114B which includes parameters 113B populating the method 111B, operation 114C which includes parameters 113C populating the method 111C, operation 114D which includes parameters 113D populating the method 111A, operation 114E which includes parameters 113E populating the method 111B, operation 114F which includes parameters 113F populating the method 111C, as well as potentially many others as represented by the vertical ellipses 114G. The operation set includes operations that are associated with three different methods 111A, 111B, and 111C. However, the inventive principles are also suitable for objects that have a single method. In that case, the difference would be that the operation set would include operations of a single method, but with potentially different parameters.

The operation set 114 is provided to a call sequence generation module 103 to allow the method 200 to proceed to an act of automatically constructing a call sequence of operations from the set of operations (act 204). There are at least three different strategies for generating a call sequence of a given length: a complete strategy, a random strategy, and a pairwise strategy.

The complete strategy involves generating enough call sequence that there is a call sequence that corresponds to every possible permutation of operations sequences that have that given length and that can be derived from operations belonging to the operation set. This complete strategy can be effective for small call sequences and for small operation sets to draw from. However, for longer call sequences and/or larger operations sets, the complete strategy becomes exponentially more processing intensive.

The random strategy involves constructing a limited number of call sequences by selecting operations from the operation set at random. This allows for call sequences to be tested without having to worry about every possible call sequence being tested. However, this advantage is also the disadvantage of this strategy. Specifically, not all call sequences are tested and therefore some exceptions may be missed.

Another strategy involves pairwise testing of call sequences. Specifically, once a call sequence having a given neighboring pair of operations has been generated, a call sequence having that same neighboring pair of operations is not be generated. The same technique may be applied to three, four, and so forth, neighboring pairs. The general thinking behind this theory is that, generally speaking, call sequence that have the same pair of neighboring operations are more likely than other calls sequences to generate the same exception, and thus have a lower utility in being tested. Methods for performing such pairwise testing are described in commonly-owned co-pending U.S. patent application Ser. No. 10/385,255, filed Mar. 10, 2003, and entitled "Automatic Identification of Input Values that Expose Output Failures in a Software Object", which patent application is incorporated herein by reference in its entirety.

Figure 2:
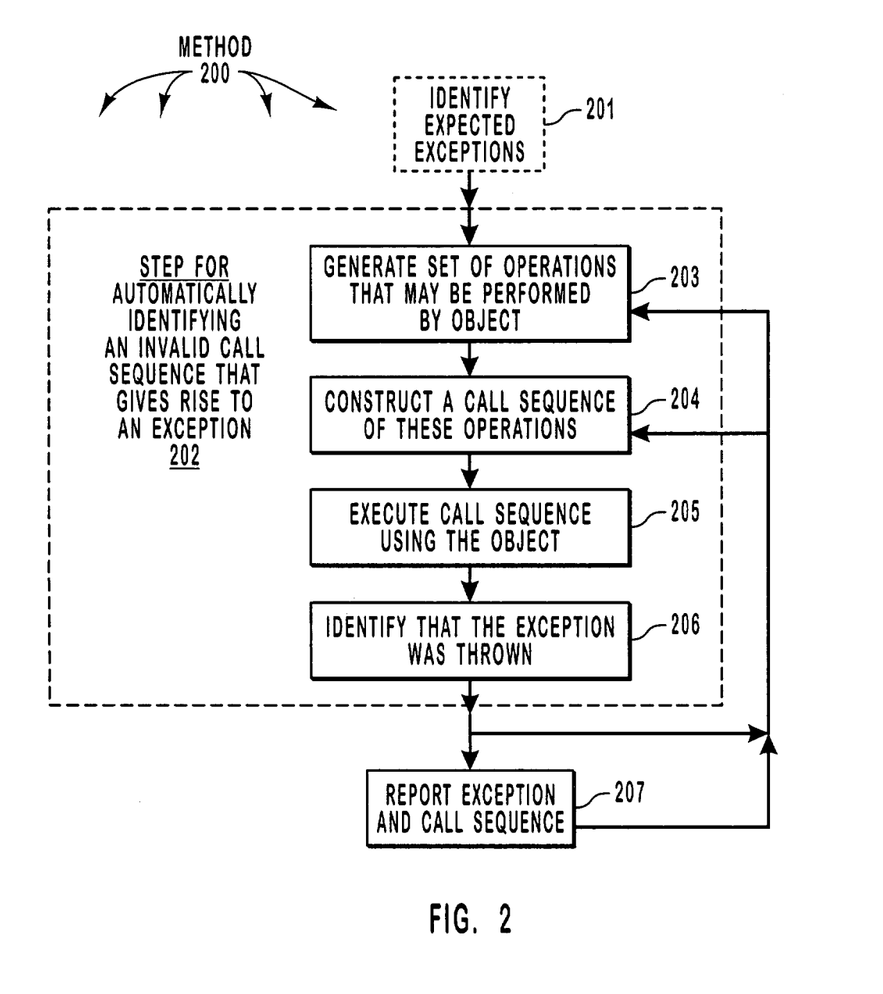
FIG. 2 illustrates a flowchart of a method for testing an object in accordance with the principles of the present invention.

Referring to FIG. 2, the generated call sequences are represented by call sequences 115, which include, for example, call sequences 115A, 115B, 115C, 115D, 115E, and 115F. Call sequence 115F is expanded to illustrate a specific example of a call sequence that is three operations long. The operations in call sequence 115F include operations 114E, 114B and 114F.

For each call sequence generated, the method 200 then automatically executes the call sequence of operations using the object (act 205). This may be accomplished by the execution module 104 receiving the call sequence, executing that call sequence on object 105, and then detecting any exceptions. Some call sequences may not result in an exception. However, for the invalid call sequences, the method 200 then includes an act of automatically identifying that an exception was thrown as a result of executing the call sequence (act 206). For example, the execution module 104 receives the exception from the object 105. This receipt may occur directly, or even indirectly via other components of the runtime environment.

Optionally, the call sequence is minimized using minimization module 106 to identify a reduced length call sequence that also results in the same exception. This may be accomplished by testing every subset of operations in the call sequence while keeping sequential dependencies in the call sequence. This could prove a processing intensive task if the call sequence length is long. Another option is to remove one operation from the original call sequence that generated the exception to determine if any of the reduced-size call sequences also generated the exception. If not, the original call sequence that generated the exception is deemed to already be minimized. Otherwise, the one or more reduced-size call sequences that also generated the exception are likewise reduced by one and so forth down the tree of reduced-size call sequences until a call sequence is found that, when reduced, does not result in the exception no matter what operation is removed.

The method 200 then includes an act of reporting the occurrence of the exception and the call sequence that gave rise to the exception (act 207). If the call sequence is minimized, it may be the minimized called sequence that is reported, or perhaps both the original call sequence that generated the exception as well as the minimized call exception may be reported. If expected exceptions were identified in act 201, then it may also be reported whether or not the exception was one of the identified exceptions.

In order to reduce the number of operations in the operation set, once all of the expected exceptions for a given method are detected using one or more call sequences, operations based on that method may potentially be excluded from any further call sequences. If even after detecting the exception, the method is not yet ready to report (as perhaps is the case when the method is to minimize the call sequence before reporting), the process returns back to the act of constructing another call sequence if one had not already been constructed and executing that call sequence. In addition, even after reporting the exception and call sequence, the process may repeat. Optionally, the process may repeat by reconstructing the set of operations that may be performed by the object as when operations having a particular associated method are removed since the exceptions associated with that method have all been detected.

Accordingly, a method, system, and computer program product for implementing the method have been described in which invalid call sequences are automatically identified to help the tester in identifying when an object generates inappropriate exceptions. Those skilled in the art will also appreciate that the invention may be practiced in network computing environments with many types of computer system configurations, including personal computers, handheld devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 4:
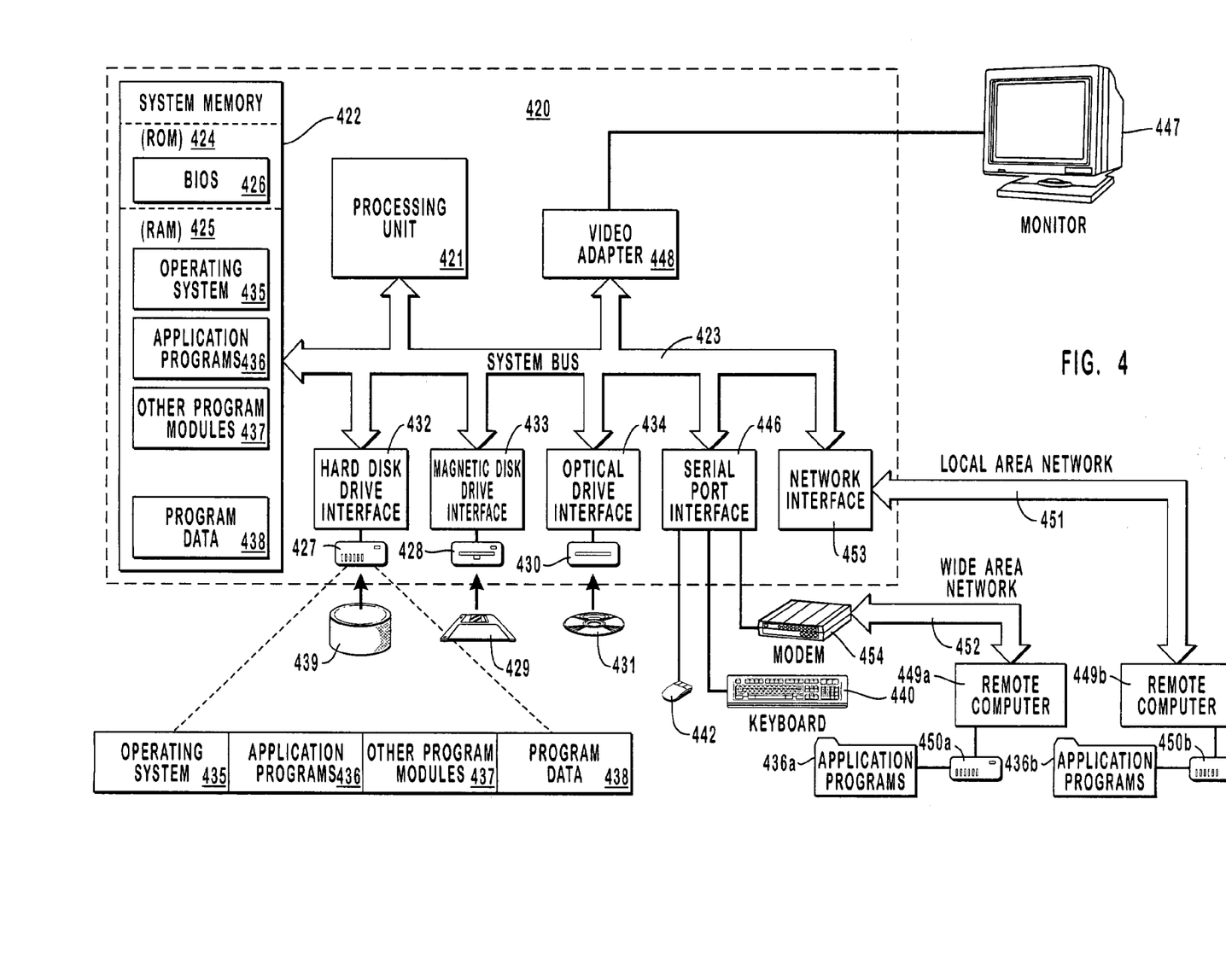
FIG. 4 illustrates a more detailed schematic of a suitable computing system that may implement the principles of the present invention.

FIG. 4 and the following discussion are intended to provide a brief, general description of a suitable computing environment for implementing certain elements of the invention. However, it should be emphasized that the present invention is not necessarily limited to any particular computerized system and may be practiced in a wide range of computerized systems.

According to one embodiment, the present invention includes one or more computer readable media storing computer-executable instructions, such as program modules, that can be executed by computing devices. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments, in addition to individual computing device, with many types of computer system configurations, including personal computers, hand-held devices, multi-processor systems, microprocessor-based or programmable consumer electronics, network PCs, minicomputers, mainframe computers, components thereof, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With specific reference to FIG. 4, an example system for implementing certain elements of the invention includes a general purpose computing system in the form of a conventional computer 420, including a processing unit 421, a system memory 422 comprising computer readable media, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. These storage media can also be used to store data structures associating correction coefficients with gamma values, as described above. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. The operation generation module 101, the parameter generation module 102, the call sequence generation module 103, the execution module 104 and the minimization module 106 represent examples of other program modules 437. In addition, methods 111, operations set 114, and call sequences 115 represent examples of program data 438.

A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In this context, the video adapter 448 is considered to include a GPU as described above. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 20 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. In a computing system that is capable of executing an object, a method for automatically identifying invalid call sequences that give rise to exceptions in order to ensure that the exceptions thrown are representative of the invalid call sequences, the method comprising:
   an act of automatically generating a set of operations that may be performed by an object, each operation including a method of the object as well as zero or more parameters associated with the object;
   an act of automatically constructing a call sequence of operations from the set of operations, wherein at least one of the methods within the call sequence includes one or more parameters generated in order to encourage an exception when executed using the object;
   an act of automatically identifying that an exception was thrown as a result of executing the call sequence using the object;
   upon the exception having been thrown as a result of executing the call sequence, an act of automatically identifying the call sequence having caused the exception as an invalid call sequence;
   an act of reporting the occurrence of the exception and the call sequence that gave rise to the exception for identifying the call sequence as an invalid call secquence; and
   an act of determining if the exception thrown as a result of the invalid call sequence was appropriate.

2. A method in accordance with claim 1, wherein the call sequence is a current call sequence, the act of constructing a call sequence comprises the following:
   an act of removing one or more operations from a previous call sequence that also gave rise to the exception.

3. A method in accordance with claim 2, wherein the act of reporting the occurrence of the exception further comprises the following:
   an act of reporting the previous call sequence as well.

4. A method in accordance with claim 2, further comprising the following:
   an act of repeating the acts of constructing, executing and identifying for one or more reduced call sequences in which one or more operations are removed from the current call sequence, wherein for each of the one or more reduced call sequences, the act of identifying whether or not an exception occurred comprises an act of identifying that the exception did not occur.

5. A method in accordance with claim 1, further comprising the following:
   an act of repeating the acts of automatically constructing, executing, identifying, and reporting for each of a plurality of call sequences constructed from the set of operations.

6. A method in accordance with claim 1, further comprising an act of repeating the acts of automatically generating, constructing, executing, identifying, and reporting for each of a plurality of call sequences.

7. A method in accordance with claim 1, further comprising the following:
   an act of identifying a set of one or more expected exceptions.

8. A method in accordance with claim 7, wherein the act of reporting further comprises the following:
   an act of reporting whether or not the thrown exception was one of the set of one or more expected exceptions.

9. A method in accordance with claim 7, wherein the act of identifying a set of one or more exceptions comprises the following:
   an act of manually identifying the set of one or more exceptions by examining documentation or source code for the object under test.

10. A method in accordance with claim 7, wherein the act of identifying a set of one or more exceptions comprises the following:
    an act of automatically identifying the set of one or more exceptions using a software program to examine the structure of the object.

11. A method in accordance with claim 10, wherein the act of automatically identifying the set of one or more exceptions using a software program to examine the structure of the object comprises the following:
    an act of automatically examining the source code of the object.

12. A method in accordance with claim 10, wherein the act of automatically identifying the set of one or more exceptions using a software program to examine the structure of the object comprises the following:
    an act of automatically examining the machine-readable instructions of the object.

13. A method in accordance with claim 1, wherein the object has a plurality of associated methods, the set of operations involving more than one of the associated methods.

14. A method in accordance with claim 1, wherein the act of automatically generating a set of operations that may be performed by the object comprises the following for each of at least of the plurality of associated methods, performing the following:
- an act of generating a set of one or more sets of one or more parameters for use with the associated method; and
- an act of including in the set of operations those operations that result from combining the associated method with each set of one or more parameters for the associated method.

15. A method in accordance with claim 14, wherein the set of one or more parameters include parameters that should result in a thrown exception.

16. A method in accordance with claim 1, wherein the object has a single associated method, the set of operations involving the single method.

17. A computer program product for use in a computing system that is capable of executing an object, the computer program product for implementing a method for automatically identifying invalid call sequences that give rise to exceptions in order to ensure that the exceptions thrown are representative of the invalid call sequences, the computer program product comprising one or more computer-readable media having thereon computer-executable instructions that, when executed by a processor, cause the computing system to perform the following:
- generate a set of operations that may be performed by the object, each operation including a method of the object as well as zero or more parameters associated with the object;
- construct a call sequence of operations from the set of operations, wherein at least one of the methods within the call sequence includes one or more parameters generated in order to encourage an exception when executed using the object;
- identify that an exception was thrown as a result of executing the call sequence using the object;
- upon the exception having been thrown as a result of executing the call sequence, automatically identify the call sequence having caused the exception as an invalid call sequence;
- report the occurrence of the exception and the call sequence that gave rise to the exception for identifying the call sequence as an invalid call sequence; and
- determine if the exception thrown as a result of the invalid call sequence was appropriate.

18. A computer program product in accordance with claim 17, wherein the one or more computer-readable media are physical media.

19. A computer program product in accordance with claim 18, wherein the physical media is a non-volatile storage media.

20. A computer program product in accordance with claim 18, wherein the physical media is non-volatile system memory.

21. A computer program product in accordance with claim 17, wherein the call sequence is a current call sequence, the one or more computer-readable media further have thereon computer-executable instructions that, when executed by a processor, cause the computing system to perform the following:
- remove one or more operations from a previous call sequence that also gave rise to the exception.

22. A computer program product in accordance with claim 21, wherein the one or more computer-readable media further have thereon computer-executable instructions that, when executed by a processor, cause the computing system to perform the following:
- repeat the constructing, executing and identifying for one or more reduced call sequences in which one or more operations are removed from the current call sequence, wherein for each of the one or more reduced call sequences.

23. A computer program product in accordance with claim 17, wherein the one or more computer-readable media further have thereon computer-executable instructions that, when executed by a processor, cause the computing system to perform the following:
- repeat the constructing, executing, identifying, and reporting for each of a plurality of call sequences constructed from the set of operations.

24. A computer program product in accordance with claim 17, wherein the one or more computer-readable media further have thereon computer-executable instructions that, when executed by a processor, cause the computing system to perform the following:
- identify a set of one or more expected exceptions.

25. A computer program product in accordance with claim 17, wherein the one or more computer-readable media further have thereon computer-executable instructions that, when executed by a processor, cause the computing system to perform the following:
- generate a set of one or more sets of one or more parameters for use with the associated method; and
- include in the set of operations those operations that result from combining the associated method with each set of one or more parameters for the associated method.

26. In a computing system that is capable of executing an object, a method for automatically identifying invalid call sequences that give rise to exceptions in order to ensure that the exceptions thrown are representative of the invalid call sequence, the method comprising:
- a step for automatically identifying an invalid call sequence that gives rise to an exception, wherein at least one of the methods within the call sequence includes one or more parameters generated in order to encourage the exception when executed using the object; and
- an act of reporting the occurrence of the exception and the invalid call sequence that gave rise to the exception for identifying the call sequence as an invalid one and determining if the exception thrown was appropriate.

27. A method in accordance with claim 26, wherein the step for automatically identifying an invalid call sequence that gives rise to an exception comprises the following:
- an act of automatically generating a set of operations that may be performed by the object, each operation including a method of the object as well as zero or more parameters associated with the object;
- an act of automatically constructing a call sequence of operations from the set of operations;
- an act of automatically executing the call sequence of operations using the object; and
- an act of automatically identifying that an exception was thrown as a result of executing the call sequence.

* * * * *